United States Patent Office 2,955,138
Patented Oct. 4, 1960

2,955,138

PROCESS FOR THE PREPARATION OF MENTHANE DIAMINE

Charles H. McKeever, Meadowbrook, Pa., and Robert N. Washburne, Houston, Tex., assignors to Rohm & Haas Company, Philadelphia, Pa., a corporation of Delaware No Drawing. Filed May 28, 1958, Ser. No. 738,320

4 Claims. (Cl. 260—563)

This invention relates to an improved process for the production of menthane diamine.

More specifically, this improved process decreases substantially the hazards associated with the use of large quantities of the very toxic chemical, hydrogen cyanide.

A further object of this invention is the prevention of contamination of the desired product with unwanted impurities and the consequent ease of purification of the final product.

A process for the production of menthane diamine, i.e., 1,8-diamino-p-menthane, is set forth in U.S. Patent 2,632,022. This process comprises reacting, in the presence of water, hydrogen cyanide and sulfuric acid with a terpene from the group consisting of limonene, i.e. dipentane, α-terpineol, β-terpineol, terpin hydrate, and α-pinene, or an inexpensive, readily available source of α-pinene, such as turpentine. The temperature of the mixture of terpene, hydrogen cyanide and water is maintained at 15° to 50° C. during the addition of the sulfuric acid, and the entire reaction mixture is then heated to 80° C., preferably between 40° and 70° C., to complete the reaction. There is formed as an intermediate 1,8-diformamido-p-menthane, which, if desired, can be isolated as such. The preferred embodiment, however, effects hydrolysis of the diformamido derivative by the addition of water with continued heating at 80° C. up to reflux temperature until hydrolysis is completed. The sulfate of 1,8-diamino-p-menthane so produced is then decomposed by the addition of a strong base and the free diamine is isolated, for example, by salting out, solvent extraction, or distillation, and is thereafter purified, preferably by fractional distillation.

The process as set forth in the prior art necessitates the maintenance of hydrogen cyanide for long periods of time at relatively elevated temperatures, a procedure which should be avoided if at all possible. Furthermore, by the separation steps employed, all the water-insoluble organic impurities remain in the impure product, necessitating laborious and expensive purification processes before the desired product is obtained in a satisfactory state of purity. The improvements of the present invention as set forth hereinafter completely overcome the aforementioned deficiencies of the prior art processes.

In the improved process of the present invention, the terpene being employed is maintained in a reaction vessel at a temperature of from about 40° to about 60° C. and the aqueous solution of hydrogen cyanide and sulfuric acid is added thereto at such a rate that the exothermic reaction which occurs maintains the reaction mixture at a temperature of from about 40° to about 60° C. during the addition period. When the addition of the aqueous solution is complete, the reaction mixture is maintained for about two to about four additional hours at about 40° to about 60° C., the preferred temperature range during both the addition period and the subsequent heating period being from about 45° to about 50° C. Additional water is then added, the mixture heated to the boiling point, and maintained at boiling temperature until organic matter ceases to appear in the steam distillate. This stripped solution is then neutralized with a strong base, and the organic layer which comprises the essentially purified 1,8-diamino-p-menthane is separated and distilled.

Suitable terpenes include the following: limonene, α-terpineol, β-terpineol, terpin hydrate, and α-pinene. Gum turpentine, which provides an inexpensive and readily available source of α-pinene, may also be used to particular advantage in the improved process of the present invention as particularly described hereinafter. While terpene alcohols, such as α-terpineol, can be used, it is understood they must dehydrate to the corresponding terpene before they can react with the hydrogen cyanide. Thus, it is preferred to use the terpenes as raw materials.

During the process, hydrogen cyanide combines with said terpenes in the ratio of two moles of hydrogen cyanide to one mole of the terpene. A lower ratio naturally results in a lowered yield of product, and, on the other hand, there does not appear to be any advantage in using the hydrogen cyanide in a ratio higher than that of three moles of hydrogen cyanide to one mole of the terpene. The recommended ratio, therefore, is 2 to 2.5 moles of hydrogen cyanide to one mole of terpene.

The role of the sulfuric acid is that of reactant, not catalyst, and two moles of acid react with one mole of terpene. In the presence of water, however, somewhat less than the ratio of two moles of acid to one mole of terpene can be employed since the water brings about some regeneration of the acid during the course of the process. In any case, a minimum ratio of 1.5 moles of sulfuric acid per mole of terpene is required. It is further recommended that the maximum ratio be 2.5 moles on the same basis, though up to 5 moles can be employed.

The reaction, which is carried out in an aqueous medium, can be considered to take place in two steps and of real importance is the amount of water which is present in each step. In the first step, the amount of water which is present directly influences the concentration and, hence, the reactivity of the sulfuric acid and the hydrogen cyanide with the terpene. It is essential that the concentration of sulfuric acid at this point be from 16% to 90%, preferably from 25% to 60%. It follows, therefore, that the amount of water employed must be from about one-tenth to approximately five times the weight of the sulfuric acid, preferably from about two-thirds to three times the weight of acid.

The time required for the addition of the aqueous hydrogen cyanide-sulfuric acid solution will vary appreciably depending on the equipment used. Thus, in small scale equipment, where the ratio of surface of the vessel to volume of contents is high, the exothermic heat of reaction can be dissipated more rapidly, and shorter addition times can be used. Similarly, even in plant scale equipment, addition time can be shortened if adequate cooling is provided. Regardless of the equipment used, however, the temperature should be maintained in the range of about 40° to about 60° C., preferably 45° to 50° C., by controlling the rate of addition of the aqueous hydrogen cyanide-sulfuric acid solution to the terpene. Thus, a simple and easily determinable control is available for determining the rate of addition.

Strong bases suitable for the neutralization of the steam stripped solution include the hydroxides of sodium, potassium or calcium.

By virtue of adding the aqueous hydrogen cyanide-sulfuric acid solution to the heated terpene, control of the very toxic hydrogen cyanide is obtained in two ways. In the first place, the unreacted hydrogen cyanide solution is maintained at room temperature and metered into the reaction mixture at a controlled rate. Furthermore, the hydrogen cyanide reacts immediately on addition;

forming the non-volatile diformamido compound. While the use of hydrogen cyanide on a laboratory scale requires only the usual well-known precautions, the use of hydrogen cyanide on a plant scale at elevated temperatures presents a serious safety problem, frequently requiring elaborate and expensive equipment to insure complete control. Thus, the use of the process of this invention overcomes a serious problem.

Even more important in its effect is the improved method of purifying the intermediate product provided by the present invention. The best amination yields obtained are in the range of from about 50% to about 70% of theoretical based on the weight of the terpene employed. In other words, from about 30% to about 50% of the terpene employed is non-reactive or is converted to non-amino organic compounds during the reaction, but is still present as water-insoluble material. In the prior art processes, the 1,8-diamino-p-menthane sulfate is neutralized directly after the hydrolysis of the foramido derivative and the free amine separates as a water-insoluble phase. However, the water-insoluble non-reactive or non-amino compounds derived from the terpene and present to the extent of from about 30% to about 50% of the weight of the terpene originally charged are also water-insoluble and are miscible or soluble in the free amine. Thus, the water-insoluble amine phase becomes grossly contaminated with unwanted and undesirable impurities.

As set forth hereinbefore, the process of the present invention specifically overcomes this gross contamination by employing a steam distillation step directly after the hydrolysis reaction. This steam distillation step effects substantially complete removal of the organic impurities, and the diamino hydrosulfate, being water-soluble and non-steam distillable, remains in the reaction vessel. Subsequent neutralization with a strong base frees the amine, which then separates as a water-insoluble phase. This is separated from the aqueous layer and then distilled. Fractional distillation is not necessary, however, and the possibility of contamination of the product with non-amino compounds is substantially eliminated. The straight run distillate is 94% to 97% 1,8-diamino-p-menthane on the basis of its neutralization equivalent and represents 93% to 95% of the total amines produced.

The steam distillation product isolation step hereinbefore described is employed to particular advantage when terpene sources are used which contain substantial amounts of liquid organic impurities which cannot be aminated. Thus, while gum turpentine represents an economical and readily available source of $\alpha$-pinene, and $\alpha$-pinene is the major terpene constituent, there are substantial amounts of liquid organic impurities present which cannot be aminated. Using the prior art processes, these impurities would be present in the crude product which separated as a water-insoluble phase when the reaction mixture is neutralized. When the process of the present invention is employed, these liquid organic impurities are removed during the steam distillation and, on neutralization, a substantially pure layer of 1,8-diamino-p-menthane is obtained.

The following examples set forth certain well-defined instances of the application of this invention. They are not, however, to be considered as limitations thereof, since many modifications may be made without departing from the spirit and scope of this invention.

Unless otherwise specified, all parts are parts by weight.

*Example 1*

The reaction vessel employed in this experiment was a three-liter, 3-neck round bottom flask fitted with an anchor type stirrer, vertical condenser, thermometer, and calibrated dropping funnels for liquid hydrogen cyanide and sulfuric acid reservoirs, connected to a common feed inlet line. Two and one-half moles (341 grams) of dipentene were charged to the flask and heated to 50° C. A mixture of 6 moles (162 grams) of hydrogen cyanide and 5.5 moles (553 grams of 98% acid) of sulfuric acid dissolved in 30 moles of water (1080 grams of 50% sulfuric acid) was then added at such a rate that the temperature of the reaction mixture was maintained at 50° C. The addition required 1.5 hours. When the addition was complete, the temperature of the reaction mixture was maintained at 55° C. for an additional 2.5 hours and then 40 moles (720 grams) of water was added to the reaction mixture and the reaction mixture heated to the boiling point. After steam distilling for three hours, the condensate was free from organic matter and steam distillation was discontinued. The mixture was cooled and neutralized with 1440 grams of 50% sodium hydroxide. The 1,8-diamino-p-menthane layer which separated was drawn off and distilled at 110° to 120° C./15 mm. The yield of 1,8-diamino-p-menthane was 57.1% based on the weight of the dipentene.

*Example 2*

1544 pounds of terpineol were charged to a kettle and heated to 50° C. A mixture of 648 pounds hydrogen cyanide and 4636 pounds of 55% sulfuric acid were added to the heated terpineol over a period of two hours and the temperature of the reaction mixture maintained at 50° C. for an additional three hours. 3864 pounds of water were then added and the mixture heated to boiling. After steam distilling for 4.5 hours, no organic material was present in the aqueous condensate. 227 pounds of a hydrocarbon-like organic liquid separated from the aqueous condensate on cooling. Heating was discontinued and the reaction mixture allowed to cool. 6560 pounds of 50% sodium hydroxide was added to the cooled reaction mixture, and, after thorough stirring, agitation was stopped. The water-insoluble layer which separated was drawn off and distilled at 120° to 130° C./26 mm. The yield of 1000 pounds of 1,8-diamino-p-menthane was 65.1% based on the weight of the terpineol charged.

*Example 3*

To the reaction vessel described in Example 1 was charged 341 grams of $d$-limonene (from grapefruit peel) and the contents heated to 35° C. Dropwise addition of hydrogen cyanide was started, immediately followed by gradual addition of 55% sulfuric acid. The simultaneous additions were maintained at constant rate and the temperature maintained at 35° to 40° C. until 162 grams of hydrogen cyanide and 1159 grams of 55% sulfuric acid had been added. Addition required 1½ hours. The batch was heated to 50° to 55° C. and held at this temperature for three hours. Then 960 grams of water was added and the mixture boiled for three hours in order to remove by steam-distillation the unreacted hydrocarbon. Sixty-one grams of organic material was removed. The batch was cooled to 80° C. and 1840 grams of 50% sodium hydroxide added over a period of 15 minutes. The layers were allowed to separate and the organic layer was distilled at 97° to 117° C./10 mm. There was obtained 260 grams (60.5% yield) of 1,8-diamino-p-menthane.

*Example 4*

Example 3 was repeated except gum turpentine was employed as the source of the $\alpha$-pinene. The hydrogen cyanide and sulfuric acid addition were carried out at 45° to 50° C. over a period of two hours. In order to remove all the unreacted hydrocarbon, it was necessary to extend the boiling period to five hours.

There was obtained 210 grams of 1,8-diamino-p-menthane which had a neutral equivalent of 95, purity of 91%. The yield, therefore, was 44% based on the weight of the gum turpentine originally charged.

*Example 5*

Terpin hydrate can also be employed as the terpene in the synthesis of 1,8-diamino-p-menthane, but since this material is a solid the procedure was modified as follows: Terpin hydrate (395 grams) and 400 grams of water were charged to the reaction vessel described in Example 1, and the contents heated to 50° C. Simultaneous addition of hydrogen cyanide and 80% sulfuric acid was continued until 162 grams of hydrogen cyanide and 800 grams of sulfuric acid had been added, maintaining a temperature of 50° to 55° C. The hydrolysis, removal of hydrocarbon and distillation was carried out as described in Example 1. The yield of 1,8-diamino-p-menthane was 62% based on the weight of terpin hydrate. Terpin hydrate is not a preferred terpene for use since it is a solid and cannot be handled advantageously.

We claim:

1. In the process for the production of 1,8-diamino-p-menthane by reacting one mole of a terpene selected from the group consisting of limonene, terpin hydrate, α-terpineol, β-terpineol and α-pinene with two to three moles of hydrogen cyanide, 1.5 to 5.0 moles of sulfuric acid, and water in an amount equal to from about 0.1 to about 5 times the weight of the sulfuric acid, heating the terpene to a temperature of about 40° to about 60° C., adding the aqueous solution of hydrogen cyanide and sulfuric acid at such a rate that the reaction mixture is maintained at a temperature of from about 40° to about 60° C., continuing heating the reaction mixture after completion of the addition at a temperature of from about 40° to about 40° to about 60° C. for a period of from about two to about four hours, whereby the diformamido derivative of said terpene is formed, and thereafter adding to the reaction mixture water equivalent to from about one to about nine times the weight of the sulfuric acid originally present, the improvement which comprises heating the diluted reaction mixture to the boiling point, steam distilling organic matter therefrom, continuing heating until organic matter ceases to steam distill, neutralizing the residual reaction mixture with a strong base, whereby a water-insoluble organic layer is formed comprising essentially purified 1,8-diamino-p-menthane, and separating the water-insoluble organic layer.

2. The process as set forth in claim 1 in which the terpene is $d$-limonene.

3. The improved process as set forth in claim 1 in which the terpene is α-pinene.

4. The improved process as set forth in claim 1 in which gum turpentine is the source of the terpene.

References Cited in the file of this patent

UNITED STATES PATENTS 2,632,022 Bortnick _____ Mar. 17, 1953